United States Patent [19]

Kinjo

[11] E Re. 31,160

Best Available Copy [45] Reissued Feb. 22, 1983

[54] TRACKING CONTROL APPARATUS FOR USE IN APPARATUS FOR REPRODUCING VIDEO SIGNALS FROM A ROTARY RECORDING MEDIUM

[75] Inventor: Hisao Kinjo, Yokohama, Japan

[73] Assignee: Victor Company of Japan, Ltd., Yokohama, Japan

[21] Appl. No.: 283,047

[22] Filed: Jul. 13, 1981

Related U.S. Patent Documents

Reissue of:

[64] Patent No.: 4,190,859
Issued: Feb. 26, 1980
Appl. No.: 884,142
Filed: Mar. 7, 1978

[30] Foreign Application Priority Data

Mar. 8, 1977 [JP] Japan ..... 52-25260

[51] Int. Cl.[3] ..... G11B 21/10

[52] U.S. Cl. ..... 369/124; 369/126; 369/275; 369/44; 369/47; 360/77; 360/10.2; 358/342

[58] Field of Search ..... 358/128.5, 128.6, 4, 358/8; 360/77; 369/44, 47, 48, 49, 111, 124, 275

[56] References Cited

U.S. PATENT DOCUMENTS

| | | | |
|---|---|---|---|
| 3,263,031 | 7/1966 | Welsh | 360/77 |
| 3,474,432 | 10/1969 | Sevilla | 360/77 |
| 3,593,333 | 7/1971 | Oswald | 360/77 |
| 3,597,750 | 8/1971 | Brunner et al. | 360/77 |
| 3,673,412 | 6/1972 | Olson | 369/45 X |
| 3,691,543 | 9/1972 | Mueller | 360/77 |
| 3,818,502 | 6/1974 | Chien et al. | 360/77 |
| 3,919,697 | 11/1975 | Walker | 360/77 X |
| 3,925,816 | 12/1975 | Kihara | 358/4 |
| 3,977,021 | 8/1976 | Kobayashi et al. | 358/128.6 |
| 3,993,863 | 11/1976 | Leedom et al. | 360/10 |
| 4,007,493 | 2/1977 | Behr et al. | 360/77 |
| 4,056,832 | 11/1977 | de Boer et al. | 360/77 |
| 4,152,727 | 5/1979 | Tatsuguchi et al. | 358/128.6 |
| 4,208,671 | 6/1980 | Ozawa et al. | 358/128.5 |
| 4,315,283 | 2/1982 | Kinjo et al. | 358/128.6 |
| 4,321,621 | 3/1982 | Kinjo et al. | 358/128.6 |

*Primary Examiner*—Bernard Konick
*Assistant Examiner*—Donald McElheny, Jr.
*Attorney, Agent, or Firm*—Louis Bernat

[57] ABSTRACT

A tracking control apparatus is employed in apparatus for reproducing video signals from a rotary recording medium. A reproducing transducer is used for reproducing recorded signals in which a main information signal has been recorded in a plurality of adjacent tracks and at least one reference signal has been recorded at an intermediate position between the longitudinal center lines of the adjacent tracks. The tracking control apparatus positions the reproducing transducer to follow a correct tracking along the main information signal track. The reference signal is separated from the signal reproduced by the reproducing transducer. A control signal is produced in response to the separated reference signal for application to the tracking control means. An automatic gain control operation fixes the level of the separated reference signal at a stage prior to the stage where the control signal is produced.

6 Claims, 12 Drawing Figures

TRACKING CONTROL APPARATUS FOR USE IN APPARATUS FOR REPRODUCING VIDEO SIGNALS FROM A ROTARY RECORDING MEDIUM

Matter enclosed in heavy brackets [ ] appears in the original patent but forms no part of this reissue specification; matter printed in italics indicates the additions made by reissue.

BACKGROUND OF THE INVENTION

The present invention relates generally to tracking control apparatus for reproducing recorded signals from rotary recording mediums. More particularly, the invention utilizes a main information signal and pilot signals for controlling tracking by the reproducing transducer which moves accurately and stably over the main information signal track of the recording medium.

Known systems record and reproduce information signals (such as video signals and/or audio signals) on and from disc-shaped, rotary mediums (referred to hereinafter simply as discs). These are broadly divided into systems using optical reproduction, systems using a reproducing stylus employing a piezoelectric element, and systems utilizing variations in the electrostatic capacitance between an electrode on the reproducing stylus and the recorded surface of the disc.

The advantages and disadvantages of these three kinds of systems have been considered. It is concluded that the electrostatic capacitance system is most desirable. Further, the present applicant has previously described, as a new system for overcoming the problems accompanying known electrostatic capacitance system, a novel "Information signal recording system" as disclosed in the specification of U.S. patent application Ser. No. 785,095, filed Apr. 6, 1977.

More specifically, in accordance with a known electrostatic capacitance system, recording is accomplished by forming a spiral guide groove in the disc for guiding the reproducing stylus. At the same time, pits are formed in responsive correspondence with an information signal to be recorded on the bottom surface of the groove. In the reproducing system, the reproducing stylus is guided by the guide groove. The stylus traces the track within the groove and reproduces the signal in response to variations in the electrostatic capacitance.

In this known system, however, a reproducing stylus guiding groove is provided in the disc. The reproducing stylus is compulsorily guided by this guide groove. It is not possible for the reproducing stylus to undergo operations such as riding over the groove wall of one track, moving into another track and returning to the original track. If the reproducing stylus were to be forced to undergo such an operation, the groove and the stylus would be damaged. For this reason, it has not been possible in this known system to carry out special reproduction such as quick-motion picture reproduction, slow-motion picture reproduction, and still-picture reproduction.

Furthermore, since the area of contact between the tip of the reproducing stylus and the guide groove of the disc is small, the stylus easily wears. When the width of the stylus tip reaches the groove width as a result of abrasive wear, the serviceable life of this reproducing stylus ends. Thus, this system is accompanied by the problem of short life of the reproducing stylus. Another problem is that fine chip particles abrade from the disc by the tracing action of the reproducing stylus along the guide groove. These chips give rise to difficulties which promote the wear and damage of the stylus and the guide groove. This wear increases the gap between the electrode at the stylus tip and the recorded surface including the pits within the disc guide groove. The reproduced output decreases because of this spacing loss.

If the rotational speed of the disc is set at a low value such as 450 rpm., for example, it will prolong the life of the stylus tip. However, wavelength of the information signal recorded in the guide groove will become short. For this reason, a low price recording apparatus cannot employ laser light in the recording system. The disadvantageous high price of a recording apparatus using an electron beam becomes unavoidable.

Accordingly, an aim of the invention is to overcome the various problems of the known systems described above. The present inventor has described in the aforecited patent application a novel system for recording and reproducing information signals. According to this proposed system, the recording system forms pits in accordance with the information signal being recorded along a spiral track on a flat disc shaped recording medium, without forming a groove therein. In the reproducing system, a reproducing stylus traces over and along this track to reproduce the recorded information signal. In this system, pilot or reference signals are recorded on or in the vicinity of a track of the information signal, such as a video signal, on a rotary disc. At the time of reproducing, the reference signals are reproduced together with the video signal. Tracking servo control is carried out so that the reproducing stylus traces accurately along the track in response to the reproduced reference signals.

By the use of this previously described system, the recording track has no groove. There is no possibility whatsoever of the reproducing stylus or the recording medium being damaged. The stylus can trace the same portion of the track repeatedly many times, whereby a special reproduction such as still, slow motion, or quick motion reproduction becomes possible. Furthermore, other difficulties of the known system are removed.

Furthermore, a reproducing stylus of highly desirable characteristics may be used for reproducing an information signal recorded on a disc without a reproducing stylus guide groove. The present inventor has previously described a novel "Stylus for reproducing information signals recorded on a recording medium" as disclosed in the specification of U.S. [patent application Ser. No. 852,366] *Pat. No. 4,199,782*. This proposed reproducing stylus has a bottom surface with a maximum width portion which is greater than the track pitch and has an electrode of a width smaller than the track pitch over a specific distance from the stylus tip.

A feature of this proposed reproducing stylus is that the stylus pressure per unit area is small. There is a low rate of abrasive wear of the reproducing stylus and the disc. Another feature of this stylus is that, the electrode width does not increase appreciably even when the stylus tip becomes somewhat worn after a long period of use. The life of the reproducing stylus is remarkably long.

Thus, by using the recording and reproducing system and the reproducing stylus according to the above cited applications, the problems encountered in the prior art are overcome. Very good results can be obtained.

In the above mentioned recording and reproducing systems, two pilot signals of mutually different frequencies are recorded on the opposite sides of each track carrying the main information signal. When the tracking of the reproducing stylus deviates relative to the main information signal track of the recording medium, and reproducing stylus reproduces a pilot signal together with the main information signal. The tracking control circuit operates in response to the pilot signal to produce an output tracking error signal corresponding to the direction and magnitude of the tracking deviation. The reproducing stylus is controlled in response to this error signal so as to track accurately over and along the main information signal track.

However, the level of the reproduced signal varies with the radial positional displacement of the reproducing stylus on the rotary recording medium. The reproduced level also depends upon variation in the contact between the electrode of the reproducing stylus and the surface of the rotary recording medium, dust and grime adhering to the surface of the rotary recording medium, and undesirable abrasive wear of the electrode part of the reproducing stylus.

Where there is a fluctuation of this nature in the level of the reproduced signal, the level of the reproduced pilot signal also fluctuates. However, a DC error voltage is obtained in response to the fluctuating level of the reproduced pilot signal. This error voltage is applied to the mechanism for controlling the tracking stylus, but the loop gain of the control circuit always varies together with variation of the level of the reproduced signal. In this case, the control loop is disrupted, and stable tracking control is not attainable, whereby erroneous tracking may occur.

SUMMARY OF THE INVENTION

Accordingly, it is a general object of the present invention to provide a novel and useful tracking control device in an apparatus for reproducing rotary recording mediums in which the above described problem has been solved.

Another and specific object of the invention is to provide a tracking control device in an apparatus for reproducing rotary recording mediums. Here, an object is to provide a device which is capable of carrying out tracking control continually, in a stable manner, irrespective of fluctuations in the level of the reproduced signal.

Still another object of the invention is to provide a tracking control device in an apparatus for reproducing rotary recording mediums. Here, an object is to carry out special reproduction operations, such as still reproduction wherein the same portion of the track is reproduced repeatedly a plurality of times, slow-motion reproduction, and quick-motion reproduction wherein tracks are skipped over, by the use of the tracking control device.

Other objects and further features of the invention will become apparent from the following detailed description when read in conjunction with the accompanying drawings.

DETAILED DESCRIPTION

Figure 1:
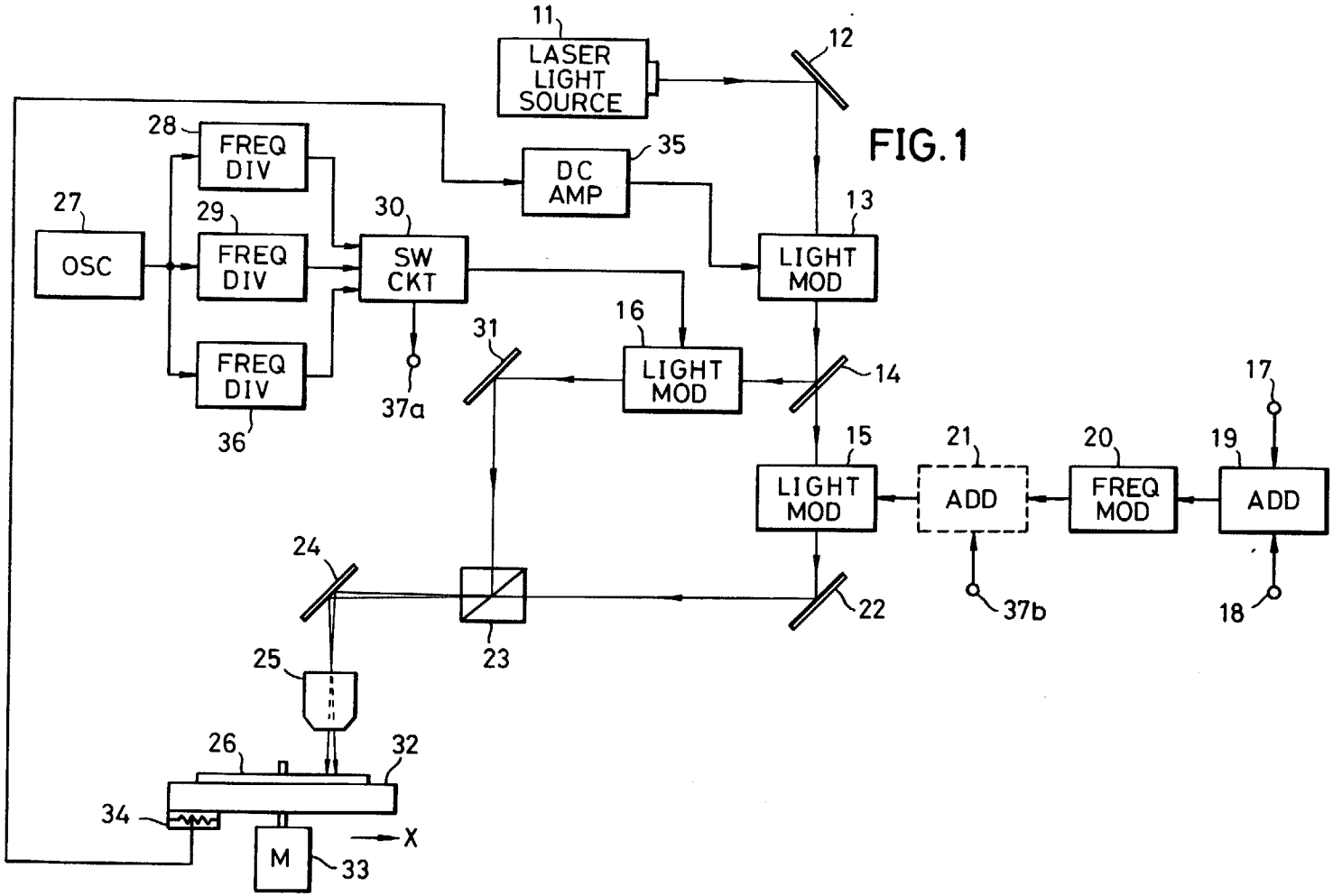
FIG. 1 is a block diagram of one example of an apparatus for recording signals on a rotary recording medium to be reproduced by a rotary recording medium reproducing apparatus using the tracking control device according to the invention.

FIG. 1 shows one example of an apparatus for recording a signal on a rotary recording medium. A laser light beam is emitted from a laser light source 11 and is reflected by a mirror 12 through a light modulator 13 for adjustment of the light quantity. The adjusted light beam is projected onto a half mirror 14, which transmits one part of the light to a light modulator 15 and reflects another part thereof to another light modulator 16.

Figure 2:
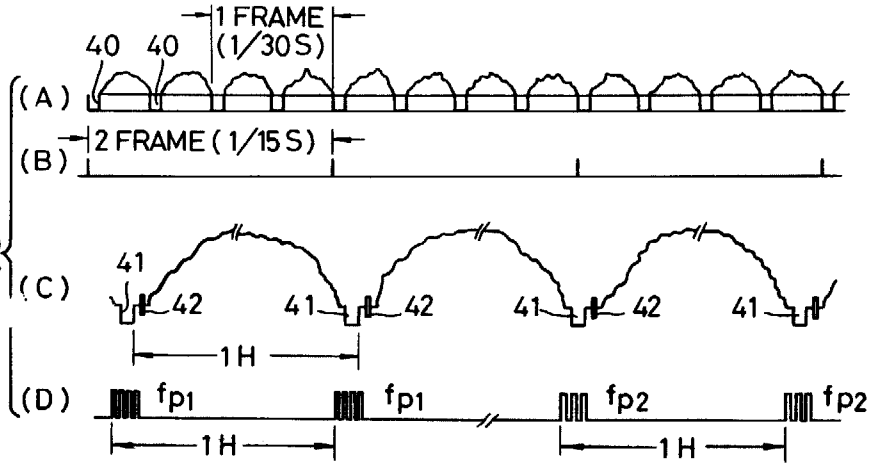
FIGS. 2(A) through 2(D) are signal waveform diagrams respectively for describing the operation of the recording apparatus shown in FIG. 1.

Information signals which are to be recorded such as a color video signal and a frequency modulated audio signal, are supplied through input terminals 17 and 18 to an adder 19. The color video signal is indicated in FIG. 2(A) with a unit of a vertical synchronizing pulse 40, and in FIG. 2(D) with a unit of the horizontal synchronizing pulse 41. Frequency modulator 20 modulates the added output of the adder 19 on a carrier wave. The resulting frequency-modulated signal is supplied as a main information signal to the light modulator 15 which modulates the light beam transmitted through the half mirror 14. The frequency-modulated signal has a carrier wave center frequency of 7.0 MHz and has a frequency deviation width of 2.2 MHz. The resulting output is projected as a first modulated light beam onto a mirror 22. There it is reflected through a polarizing prism 23 to a mirror 24, and an objective lens 25. The beam brought to a focus on a photosensitive agent coating an original recording disc 26 made of material such as glass.

On the other hand, a reference oscillator 27 produces an output signal of 3.58 MHz synchronized with a color subcarrier of the color video signal. This output signal is frequency divided by 1/5 and 1/7, for example, at frequency dividers 28 and 29, respectively. These divided frequencies are reference signals (hereinafter referred to as pilot signals) for tracking control of a frequency fp1 (of 716 KHz) and a frequency fp2 (of 511 KHz). The signal from the oscillator 27 is frequency divided by 1/13 into a pilot signal of frequency fp3. Accordingly, the pilot signals of frequencies fp1, fp2 and fp3 exist in a frequency band which is lower than the frequency band of the frequency modulated information signal.

In the present embodiment of the invention, a video signal of two frames (4 fields) is recorded for every revolution of the original disc 26. The switching circuit 30 operates in the following manner. In a certain two-frame period as indicated in FIG. 2(B), the pilot signal fp1 from the frequency divider 28 is in phase synchronism with the horizontal blanking period for every period H (horizontal scanning period), as indicated in FIG. 2(D). In the succeeding 2-frame period, the pilot signal fp2 is obtained from the frequency divider 29 in phase synchronism with the horizontal blanking period, for every period H. This operation is repeated thereafter. Furthermore, the pilot signal fp3 is obtained from the frequency divider 36 is obtained in phase synchronism with the vertical blanking period every two frames. The output pilot signals from the switching circuits 30 are supplied to the light modulator 16. In a modification, the pilot signal of frequency fp3, from the switching circuit 30, is not supplied to the light modulator 16. It may be supplied through terminals 37a and 37b, to an adder 21 in which it is added to the frequency modulated main information signal from the frequency modulator 20. In this modification, the pilot signal of frequency fp3 is recorded at positions corresponding to the vertical blanking periods in the main information signal track.

The light beam reflected by the half mirror 14 is modulated in the light modulator 16 by the pilot signals. The resulting output is reflected by a mirror 31 as a second modulated light beam. The beam is introduced into the polarizing prism 23, where its polarization plane is angularly shifted by 90 degrees from that of the first modulated light beam. The second modulated light beam leaves the polarizing prism 23, together with the first modulated light beam. They are reflected by the mirror 24, through the objective lens 25, and focused onto the original recording disc 26.

The original disc 26 is mounted on a turntable 32, and rotated at a speed of, for example 900 rpm., by a motor 33. The origial disc 26, turntable 32, and motor 33 are unitarily and continuously transported at a specific pitch in the arrow direction X, by means of a transporting mechanism (not shown). As a result, the main information signal and the pilot signals are recorded on the original disc along a spiral track progressing from its outer periphery toward its central part. These signals are respectively recorded by the first and second modulated light beams.

Furthermore, a displacement position detector 34 comprises a potentiometer which detects the displacement position due to the transporting movement of the original disc 16 and the turntable 32, as they are transported in the arrow direction X. The potentiometer produces an output DC voltage which varies responsive to the displacement position. This detected DC voltage is passed through a DC amplifier 35 to light modulator 13. The light quantity is adjusted to control the intensity of the beam from the laser light source 11 in accordance with the radial position of the light beam spot focused on the disc 26. This arrangement and operation compensates to eliminate the effect of any difference in the relative linear speed due to the shifting position of the light beam spot along the radial direction as the track spirals in toward the center of the original disc 26.

The original disc 26 is exposed to light in the above described manner and subjected to a known developing process and to a known disc fabricating process. A completed recorded disc is thus obtained. The recorded disc comprises, for example, a disc substrate made of polyvinyl acetate (PVAC), in which the pits are formed along a spiral track. A metal electrode coating is formed with a thickness of 400 Å, for example, on the disc substrate, and a dielectric coating film of a thickness of 400 Å is adhered onto the metal coating. The disc may be given an electrode function by using another material instead of a metal coating film.

It is to be observed that an electron beam may be used in place of a laser light beam in the above described apparatus. Furthermore, instead of the arrangement wherein the original disc, turntable 32, and motor 33 are transported in the arrow direction X, an arrangement may be provided wherein an optical system projects the light beams onto the original disc 26 with the beam being transported in the direction opposite to the arrow direction X.

Figure 3A:
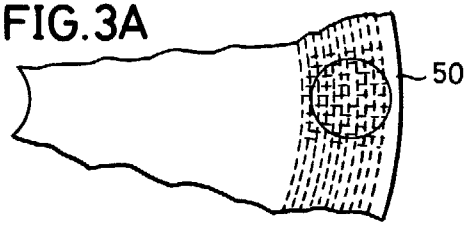
FIGS. 3A and 3B are fragmentary plan views respectively showing in successive enlargements examplary track patterns recorded on a rotary recording medium, by the recording apparatus illustrated in FIG. 1.
Figure 3B:
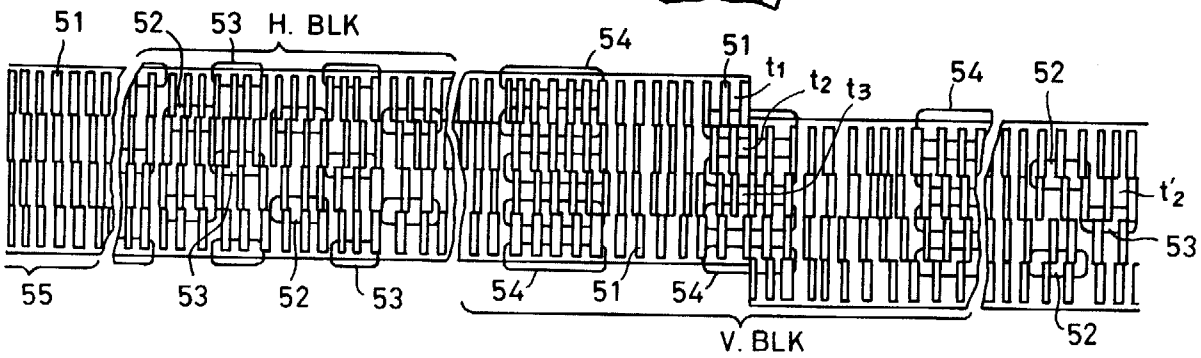

One embodiment of the disc, according to the invention, which is obtained by the recording apparatus illustrated in FIG. 1, will now be described with reference to FIGS. 3A and 3B. In FIG. 3A, the recorded disc 50 has a track formed in a spiral path. One portion within its circular shape is shown enlarged in FIG. 3B. In FIG. 3B, successive turns of the single continuous spiral track, on the disc 50 are designated as $t_1$, $t_2$, $t_3$.... Each track segment is constituted by the formation of pits 51 of the main information signal. With respect to one track $t_1$, during every period H, at a position (H.BLK) corresponding to the horizontal blanking period, pits 52 of the first pilot signal fp1 are formed on one lateral side of the track as viewed in the track path direction (for example, on the right hand side in the direction of rotation). Pits 53 of the second pilot signal fp2 are formed on the other side (left hand side) of the track. With respect to the adjacent track $t_2$, the pits 53 of the second pilot signal fp2 are formed on one side (right hand side) as viewed in the track path direction at a position corresponding to the horizontal blanking period during every period H. On the other side (left hand side), the pits 52 of the first pilot signal fp1 are formed. Thus, the positions at which the pits 52 and the pits 53 of the first and second pilot signals fp1 and fp2 are formed are alternately reversed in the disc radial direction.

In addition, pits 54 of the third pilot signal fp3 are formed in the position (V.BLK) corresponding to the vertical blanking period which coincides with the parts where the individual track turn designation numbers change.

In the present embodiment of the invention, the pilot signal pits 52 and 53 are formed at only the position H.BLK within one period H. They are not formed at other parts 55, but the pits 52 and 53 may also be formed in these parts 55.

Figure 4:
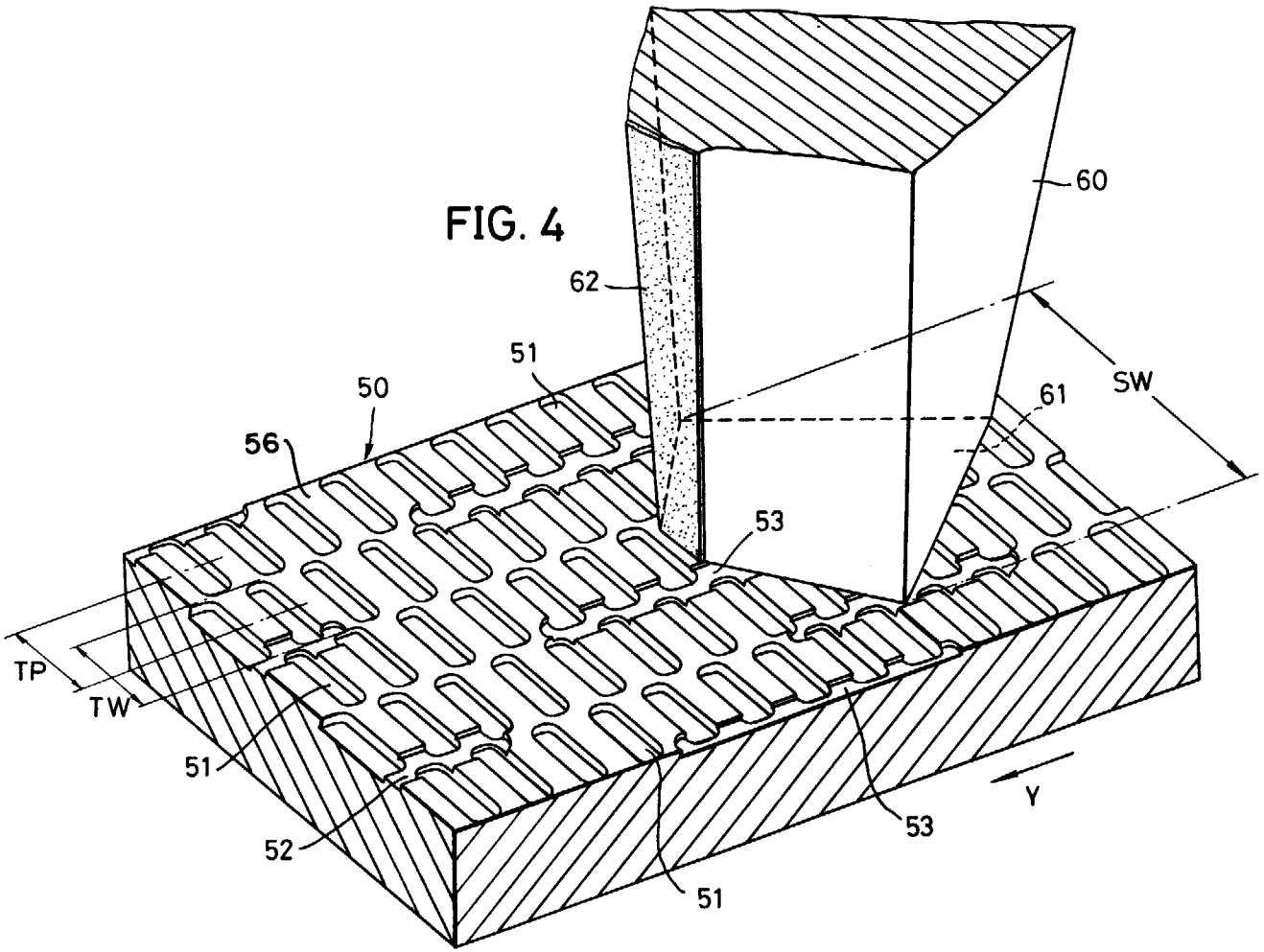
FIG. 4 is a greatly enlarged perspective view showing a reproducing stylus tracking the information signal recording medium shown in FIGS. 3A and 3B.

The part of the position H.BLK shown in FIG. 3B of the disc 50 is shown as being further enlarged in FIG. 4. The surface 56 of those parts of the disc 50, in which pits are not formed, is planar and does *not* have a guide groove.

In the present embodiment of the invention, the pits 51 are formed so that one of the edge lines of each track is substantially coincident with the nearest edge line of the adjacent track. That is, the adjacent tracks $t_1$, $t_2$, $t_3$, . . . are formed so that they are successively contiguous. Accordingly, the track pitch TP is substantially equal to the track width TW. At central positions which are approximately intermediate between the centerlines of the mutually adjacent tracks, pilot signal pits 52 and 53 are formed with overlapping on two tracks adjacent each other.

FIG. 4 shows a reproducing stylus 60 tracing the recorded track on the disc 50, having the above described pit arrangement. Only the bottom face 61 of the stylus 60 and the bottom face of an electrode 62 are shown. The bottom face 61 of the stylus has a part with a maximum width SW, which is greater than the track pitch TP of the disc 50. An electrode 62 has a thickness of 500–3000 A and is fixed to the rear face of the stylus at the rear edge of the bottom face 61. As the disc 50 rotates in the arrow direction Y, the reproducing stylus 60 traces along the surface of the disc 50. The electrostatic capacitance between the electrode 62 and an electroconductive layer covering the entire surface of the disc varies in response to the pits 51. The main information signal recorded by the pits 51 is reproduced.

At the same time, the pilot signals of frequencies fp1 and fp2 are recorded by the pits 52 and 53 and are also reproduced by the electrode 62. If the center of the electrode 62 deviates from the centerline of the [tradk] *track*, a level difference occurs in the reproduced pilot signals. A tracking servo operation is then carried out by a circuit described hereinafter.

Since the main information signal tracks comprise a series or succession of pits formed in substantially a contiguous state there is a substantially uniform effect because of unnecessary light beam parts projected onto the original disc by the recording apparatus. Furthermore, there are not spacing parts between adjacent tracks. During tracking and reproducing by the reproducing stylus 60, the bottom face 61 of the stylus structure is in sliding contact with the disc surface, in a sustantially uniform state. The groove guiding phenomenon does not arise.

Since the adjacent tracks are contiguous to each other, the pit width (i.e., track width) can be set at a greater value if the track pitch is the same as in the conventional case, whereby the S/N ratio becomes greater. Alternatively, if the pit width is made the same as in the conventional case, the track pitch can be decreased, whereby the recording capacity is increased.

The reproducing stylus 60, has a shape as previously described in the aforecited applications, for example. The reproducing stylus 60 has an electrode 62 of a construction such that the electrode width at the bottom face does not become very large even when the bottom face of the electrode becomes worn. The life of the stylus is thus prolonged.

When the electrode 62 is directly over or covering the pits 52 and 53, variations in capacitance occur. But, capacitance variations occur and the pilot signals are reproduced even when the electrode 52 is not directly over the pits 52 and 53.

Figure 5:
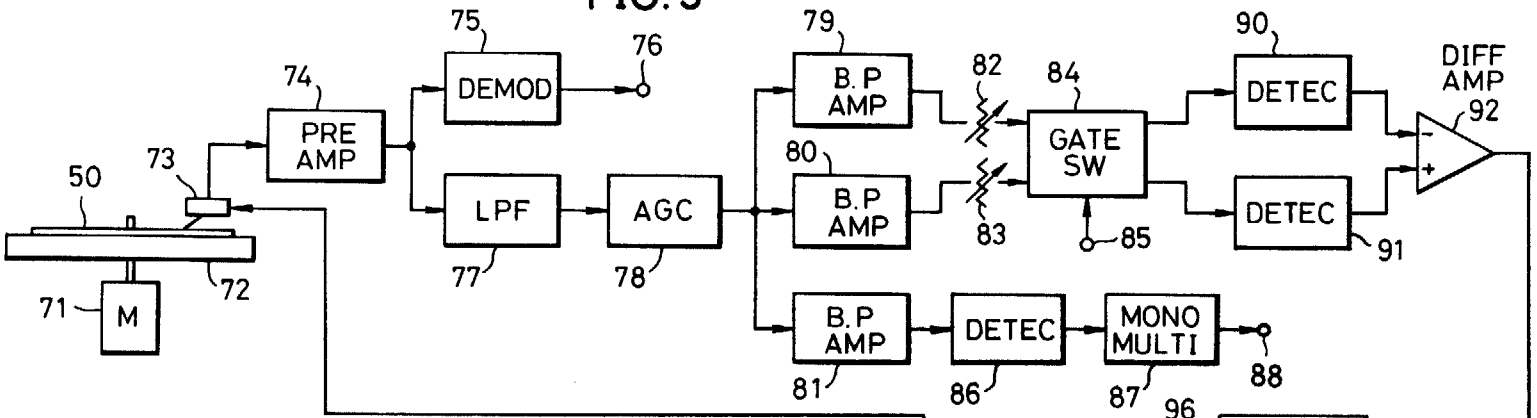
FIG. 5 is a block diagram of one embodiment of the tracking control apparatus according to the invention in a reproducing apparatus.

An example of an apparatus for reproducing (playing) the above disc will now be described with reference to FIG. 5. A motor 71 rotates the recorded disc 50 on turntable 72 at a rotational speed of 900 rpm. The track on the disc 50 is traced by the reproducing stylus 60 which is fitted into a reproducing transducer 73. The reproducing stylus 60 picks up a reproduced signal as a minute variation of electrostatic capacitance from the disc 50 and supplies the signal to a preamplifier 74 having a resonant circuit. The resonant frequency varies in response to this variation in electrostatic capacitance in order to form a signal of a desired level. The resulting output of the preamplifier 74 is demodulated into the original information signal by a demodulator 75 and is sent out as an output through an output terminal 76.

The output signal of the pre-amplifier 74, is supplied to a low-pass filter 77, from which a pilot signal is obtained. The output signal of the low-pass filer 77 is supplied to an automatic gain control (AGC) circuit 78. The low-pass filter 77 removes a frequency modulated information signal component so that the AGC circuit 78 will not operate in response to the main information signal component and takes out a low-frequency component including a pilot signal.

When, the contact between the reproducing stylus 60 and the disc 50 fluctuates, the level of the reproduced signal fluctuates. However, the AGC circuit 78 operates to always maintain the specific levels of the pilot signals irrespective of such fluctuations of the reproduced signal level. The reproduced levels of the first and second pilot signals fp1 and fp2 vary in response to the tracking deviation of the reproducing stylus 60. Tracking control is carried out by detecting this variation. For this reason, if the AGC circuit were to cause the reproduced levels of the two pilot signals to be constant, tracking control would not be possible in response to the above mentioned detection output. Accordingly, the AGC circuit 78 is operated to always maintain the total reproduced level of the pilot signals at a specific level.

Figure 7:
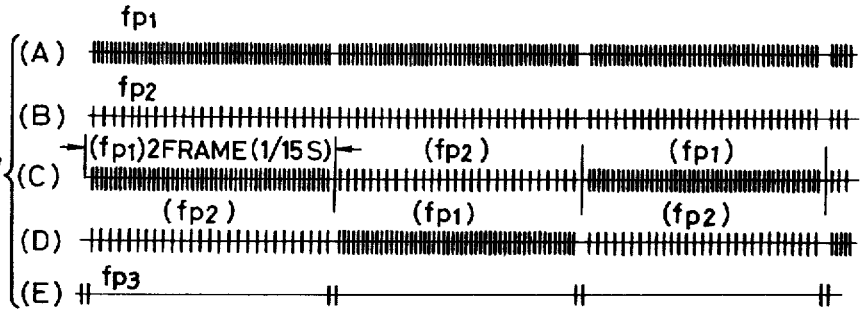
FIGS. 7(A) through 7(E) are signal waveform diagrams for a description of the operation of the apparatus shown in FIG. 5.

The output signal of the AGC circuit 78 is supplied respectively to amplifiers 79, 80 and 81. Here, each of the amplifiers 79 and 80 is a band-pass amplifier. The amplifier 79 has a steep passing frequency characteristic at only the frequency fp1. The amplifier 80 has a steep passing frequency characteristic at only the frequency fp2. The first and second reference *or pilot* signals fp1 and fp2 shown in FIGS. 7(A) and 7(B) are obtained separately from the amplifiers 79 and 80, respectively. These signals pass through level adjustors 82 and 83, where their levels are adjusted. The resulting signals are then supplied to a gate switching circuit 84.

The amplifier 81 is a band-pass amplifier having a steep passing frequency characteristic at only the frequency fp3, for enabling a third reference *or pilot* signal fp3 to pass therethrough. The reference signal, shown in FIG. 7(E), is obtained from the amplifier 81 and supplied to a detecting circuit 86. The resulting output signal is supplied to operate a monostable multivibrator 87. The monostable multivibrator 87 does not respond to noise components. The output signal thereof is derived from an output terminal 88.

In a normal reproducing mode, the output signal from the terminal 88 is applied to trigger a flip-flop circuit (not shown). The output signal of the flip-flop circuit is a switching pulse applied, through an input terminal 85, to a gate switching circuit 84. In a special reproducing mode (such as still picture reproducing mode) or slow motion picture reproducing mode, the signal from the terminal 88 is applied to a kick-back pulse forming circuit (not shown) whose output kick-back pulse is applied to a terminal 100.

The gate switching circuit 84 switches the pilot signal fp1 and fp2 every revolution period of the disc 50 in response to the switching pulse supplied through the terminal 85. The disc rotational speed in the present embodiment of the invention is 900 rpm. Therefore, two frames of the video signal are recorded for each revolution of the disc 50. As a result, a switching pulse inverts polarity every two frames (1/15 second). The gate switching circuit 84 supplies a signal as indicated in FIG. 7(C) and a signal as indicated in FIG. 7(D), respectively, to detecting circuits 90 and 91.

The detecting circuits 90 and 91 detect the envelopes of their respective input reference *or pilot* signals and convert the envelopes into DC voltages. These voltages are then supplied to the input terminals of a differential amplifier 92. This differential amplifier 92 compares the output signals of the two detecting circuits 90 and 91 which vary in response to the reproduced levels of the reference *or pilot* signals fp1 and fp2. This generates an output tracking error signal which indicates the tracking error direction and quantity.

This output error signal passes through a variable resistor 93 for adjusting the loop gain of the entire servo loop and is supplied to a proportional compensation circuit 94 and to a differential compensation circuit 95 of known circuits. The resulting signals are given a specific characteristic compensation in the compensation circuits 94 and 95 and are respectively passed through variable resistors 96 and 97 for gain adjustment. They are then supplied to a power amplifier 98, where the signals are amplified to a specific power. The resulting output of the power amplifier 98 is led out through an output terminal 99 and applied to the tracking control mechanism of the reproducing transducer 73.

Figure 6:
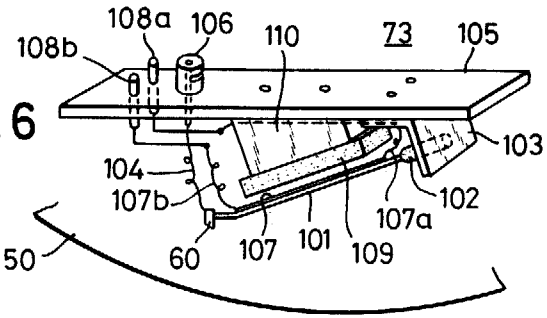
FIG. 6 is a perspective view of one example of a reproducing transducer having a tracking control mechanism.

The reproducing transducer 73 has an arrangement as shown in FIG. 6, for example. A cantilever 101 has a reproducing stylus 60 mounted at its free end. Its other end is connected via a damper 102 to a bracket 103. The electrode of the reproducing stylus 60 is connected through a very thin, slack, and flexible lead wire 104 to a terminal 106 on the support plate 105. Except at its ends, a very thin gold wire 107 is bonded to the cantilever 101 over a specific distance in the longitudinal direction. The ends 107a and 107b lead wire are respectively connected, in a slackened state, to terminals 108a and 108b on the support plate 105. A permanent magnet 109 is secured by way of a bracket 110 to the lower surface of the support plate 105. The wire 107 is thus disposed in the strong magnetic field of the magnet 109.

The control signal from the output terminal 99 is applied across the terminals 108a and 108b. When the control signal current flows through the terminals 108a and 108b and the wire 107, a displacement force acts on the wire 107. This force is in the transverse direction which is perpendicular to the longitudinal direction of the cantilever beam 101. The force is generated in response to the current in the wire 107, according to the Fleming's left-hand rule, since the wire 107 is disposed within the magnetic field of the magnet 109. Since the wire 107 is bonded to it, the cantilever 101 is displaced by the force acting on the wire 107. As a result, the reproducing stylus 60 is displaced in a direction perpendicular to the longitudinal direction of the track. Tracking control is accomplished so that the reproducing stylus 60 traces accurately along the track.

Figure 8:
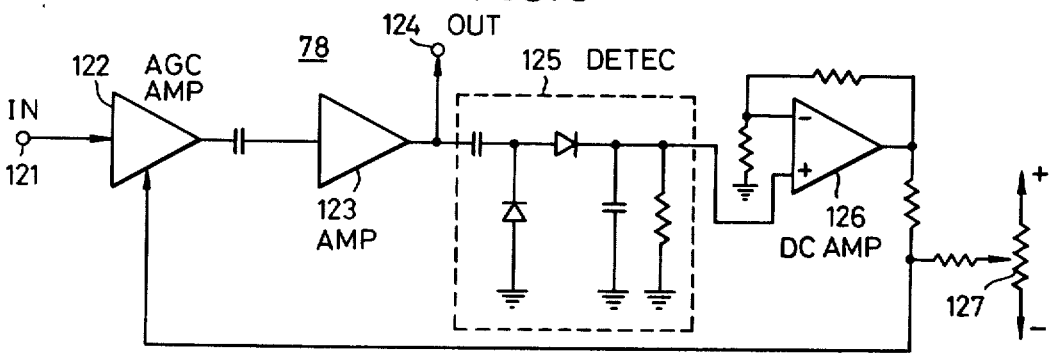
FIG. 8 is a circuit diagram showing one embodiment of a specific automatic gain control circuit in the apparatus shown in FIG. 5.

One embodiment of a specific AGC circuit 78 is shown in FIG 8. The output signal of the low-pass filter 77 is supplied through an input terminal 121 of the AGC circuit 78 and to an AGC amplifier 122. The output of amplifier 122 is supplied through a coupling capacitor to an amplifier 123. The output signal of the amplifier 123 is led out through an out terminal 124 and to the amplifiers 79, 80 and 81. The output signal of the amplifier 123 is also supplied to a detection circuit 125, where it is envelope detected and converted into a DC component. The output of the detection circuit 125 is amplified in a DC amplifier 126 and is converted into a DC voltage corresponding to the level of the reproduced signal. At potentiometer 127, a DC voltage level is superimposed upon this output DC voltage. The DC level is fed back from the bias adjuster to control the gain of the AGC amplifier 122. As a result, pilot signals fp1, fp2, and fp3 have constant levels when they are led out through the output terminal 124.

The output of the differential amplifier 92 is a DC voltage used as a tracking error signal. Therefore, it is apparent that the AGC circuit 84 cannot be connected on the output side of the differential amplifier 92. Furthermore, an automatic gain control reference voltage cannot be obtained from this output side.

Figure 9:
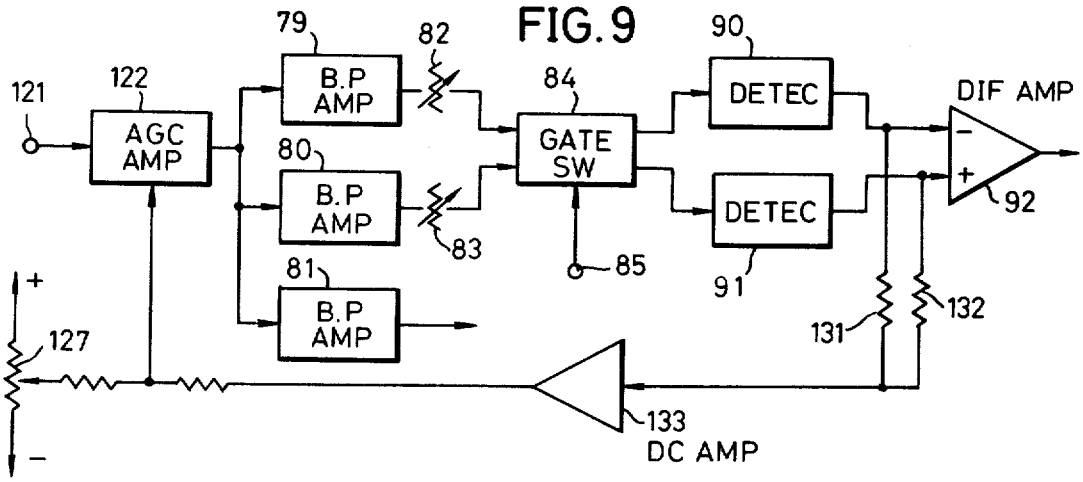
FIGS. 9 and 10 are block diagrams respectively showing modified examples of an essential part of the apparatus shown in FIG. 5.
Figure 10:
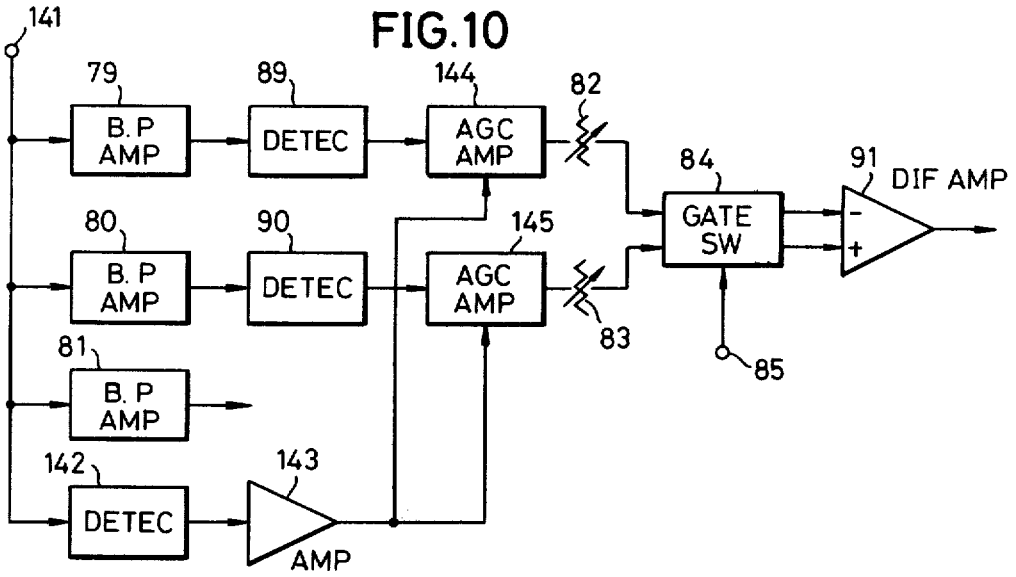

Next, examples of modification of the AGC circuit 78 will be described with reference to FIGS. 9 and 10, respectively. In FIGS. 9 and 10, those parts which are the same as corresponding parts in FIGS. 5 and 8 are designated by like reference numerals. Description of such parts will be omitted.

Referring first to FIG. 9, the output of the low-pass filter 77 is introduced through the input terminal 121 and is supplied to the AGC amplifier 122. The [outputs of] *detected outputs of the reference or pilot signals fp1 and fp2 from* the detection circuits 90 and 91 are supplied to the differential amplifier 92 and are passed through resistors 131 and 132 to be added together. The resulting combined signal is passed through a DC amplifier 133 and fed back as a gain control voltage to the AGC amplifier 122. *As a result, the reference or pilot signals fp1 and fp2 are controlled such that the total level of the reference or pilot signals fp1 and fp2 is maintained at a specific level.*

Referring to FIG. 10, the signal from the low-pass filter 77 is introduced through an input terminal 141 and is supplied to amplifiers 79, 80 and 81 and to a detector 142. The output DC voltage of the detector 142 is amplified by an amplifier 143 and then applied as a gain control voltage to AGC amplifiers 144 and 145. These AGC amplifiers 144 and 145 carry out AGC operation from a DC level *to control the levels of the reference or pilot signals fp1 and fp2.*

As a further modification of the embodiment shown in FIG 10, a circuit may add outputs of the amplifiers 79 and 80 which are supplied to the detecting circuit 142. In this case, the low-pass filter 77 may be omitted. Another AGC amplifier may be provided at the output side of the amplifier 81.

Next, operations in special reproducing modes, such as still picture and slow motion picture reproducing modes, will be explained. In the still picture reproducing mode, the reproducing transducer 73 stops moving in a radial direction across the disc 50. Then, the reproducing transducer 73 repeatedly traces the same one track $t_2$, for example. In this case, there is a necessity for the reproducing stylus to trace the track $t_2$ and an end portion thereof indicated by $t_2$, and then to again trace the track $t_2$ after passing the position V.BLK. However, if a polarity switching operation of the gate switching circuit 84 merely ceases, when the reproducing stylus begins to trace the track $t_3$ after having traced the track $t_2$, the reproducing stylus jumps indefinitely to the track $t_2$ or $t_4$ responsive to a detection of the pilot signals tp1 and fp2. It does not necessarily follow that the reproducing stylus definitely traces the track $t_2$ again.

Then, in the still picture reproducing mode, the gate switching circuit 84 stops its polarity switching over operation. At the same time, the kick-back pulse obtained from the signal at the terminal 88 is applied, through the terminal 100, to a power amplifier 98 during the vertical blanking period. The signal from the terminal 88 is shaped into the kick-back pulse form shown in FIG. 11(B) which corresponds to two frame intervals of the video signal shown in FIG. 11(A).

Responsive to the kick-back pulse, the tracking control mechanism for the reproducing stylus is kicked back and jumps from the track $t_{2'}$ to the track $t_2$ at the position V.BLK. The polarity of the kick-back pulse is selected in consideration of a control polarity of the tracking control system and mechanism. Besides, the amplitude and pulse width of the kick-back pulse is selected so that the kicked back reproducing stylus jumps one track pitch.

Figure 11:
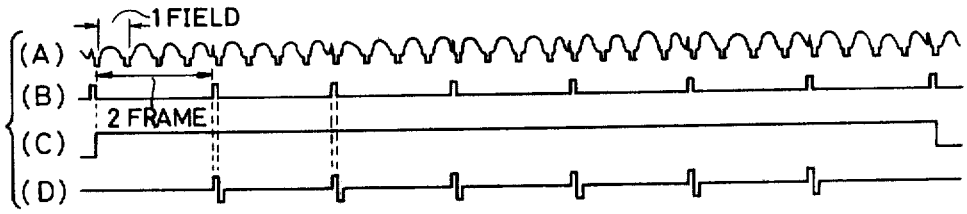
FIGS. 11(A) through 11(D) are signal waveform diagrams for describing still reproduction and slow-motion reproduction.

An operation of the slow motion picture reproduction is next described. If the slow motion picture reproduction ratio is 1/7, for example, the transferring speed of the reproducing transducer 73 is reduced to 1/7 in the radial direction along the disc 50. A kick-back pulse shown in FIG. 11(D) is obtained from the signal and, is applied to the terminal 100. At the same time, the frequency of the switching pulse is divided by 1/7 when supplied from the terminal 88 to the terminal 85, as shown in FIG. 11(C). The resulting pulse is supplied to the gate switching circuit 84 through the terminal 85. The slow motion of the picture reproduction is thus 1/7 of the original motion.

The reproducing stylus is transferred to the adjacent track after repeated reproduction of the same track of the predetermined number of times (seven times in this case). The polarity of the switching pulse to be supplied to the gate switching circuit 84 during the vertical blanking period is reversed, while the kick-back pulse is not supplied to the terminal 100.

The system of the present invention may be used not only for recording and reproducing video signals but also for recording and reproducing audio signals, and the like. A high dynamic range, with high quality, is available for recording video and audio signals with multichannels on the same single track. The reproducing and tracking of this recorded information track is somewhat as described hereinbefore.

Further, this invention is not limited to these embodiments. Variations and modifications may be made without departing from the scope of the invention.

What is claimed is:

1. A tracking control system in a reproducing apparatus having a transducer for reproducing signals recorded on a rotary recording medium in which a main information signal has been recorded in a plurality of adjacent tracks, first and second reference signals having different frequencies, each of said reference signals being alternately recorded at intermediate positions between longitudinal center lines of the adjacent tracks, and a third reference signal being recorded at positions corresponding to a switching of the first and second reference signals, said first, second and third reference signals being in a frequency band which is lower than the frequency band of the main information signal, said tracking control apparatus comprising:

means for controlling the reproducing transducer to correctly track along the main information signal track;

a first separating means for filtering and separating a low frequency band component including at least the first, second and third reference signals from the signal reproduced by the reproducing transducer;

a second separating means for separating the low frequency band component into the first, second and third reference signals;

means for detecting the separated first and second reference signals;

means for selectively switching the separated first and second reference signals responsive to the separated third reference signal, said switched first and second reference signals being applied to the detecting means;

a control signal producing means for producing a control signal in response to the outputs of the detecting means and for applying the control signal to the tracking control means; and automatic gain control means for bringing the [levels] *total level* of *at least* the separated first[,] *and* second [and third] reference signals to a predetermined level, said automatic gain control means being in a signal transmission path between the first separating means and the control signal producing means.

2. A tracking control apparatus as claimed in claim 1 in which said automatic gain control means comprises an amplifier means in the signal transmission path between the first separating means and the control signal producing means, and means for generating a gain control signal responsive to a signal appearing in the signal transmission path, the gain control signal being applied to the automatic gain control amplifier means.

3. A tracking control apparatus as claimed in claim 1 in which said automatic gain control means is in a signal transmission path between the first separating means and the second separating means.

4. A tracking control apparatus as claimed in claim 3 in which said automatic gain control means comprises an automatic gain control amplifier means which is supplied with the output signal of the first separating means, the output signal of said automatic gain control amplifier means being supplied to the second separating means, a detecting circuit means for detecting the output of the automatic gain control amplifier means, and means for feeding back the output of the detecting circuit means as a gain control voltage to the automatic gain control amplifier means.

5. A tracking control apparatus as claimed in claim 1 in which said automatic gain control means comprises an automatic gain control amplifier means which is supplied with the output signal of the first separating means, the output signal of said automatic gain control amplifier means being supplied to the second separating means, and means for adding the outputs of the detecting means and for feeding back the added signal as a control signal to the automatic gain control amplifier means.

6. A tracking control apparatus as claimed in claim 1 in which said automatic gain control means comprises an automatic gain control amplifier means in a signal transmission path between the detecting means and the control signal producing means, and means for applying the output signal of the first separating means as a gain control voltage to the automatic gain control amplifier means.

* * * * *